(12) United States Patent
Chang et al.

(10) Patent No.: US 7,620,125 B1
(45) Date of Patent: Nov. 17, 2009

(54) FREQUENCY ESTIMATION APPARATUS AND RELATED METHOD

(75) Inventors: I-Ping Chang, Tai-Nan (TW); Ho-Chi Huang, Hsin-Chu Hsien (TW)

(73) Assignee: MediaTek Inc., Hsin-Chu Hsien (TW)

( * ) Notice: Subject to any disclaimer, the term of this patent is extended or adjusted under 35 U.S.C. 154(b) by 554 days.

(21) Appl. No.: 11/306,365

(22) Filed: Dec. 26, 2005

(51) Int. Cl.
*H04L 27/00* (2006.01)
(52) U.S. Cl. .................. 375/326; 375/316; 375/340; 375/344
(58) Field of Classification Search .......... 375/326, 375/316, 340, 344
See application file for complete search history.

(56) References Cited

U.S. PATENT DOCUMENTS

| | | | | |
|---|---|---|---|---|
| 5,761,250 A | * | 6/1998 | Lin | 375/344 |
| 6,463,266 B1 | * | 10/2002 | Shohara | 455/196.1 |
| 6,801,567 B1 | | 10/2004 | Schmidl et al. | |
| 7,171,162 B2 | * | 1/2007 | Lin et al. | 455/67.11 |
| 2005/0113033 A1 | | 5/2005 | Lin et al. | |

OTHER PUBLICATIONS

Tyler Brown et al., "An Iterative Algorithm for Single-Frequency Estimation", IEEE Transactions on Signal Processing, Nov. 2002, pp. 2671-2682, vol. 50, No. 11.

* cited by examiner

*Primary Examiner*—Ted M Wang
(74) *Attorney, Agent, or Firm*—Winston Hsu

(57) ABSTRACT

A method of frequency estimation includes (a) receiving frequency correction channel (FCCH) data samples; (b) calculating an estimated frequency offset based on the received data samples; (c) compensating the received data samples using the estimated frequency offset; (d) repeating steps (b)-(c) for a predetermined number of iterations by substituting the compensated data samples for the received data samples in step (b); and (e) summing the estimated frequency offset of each iteration to calculate an overall estimated frequency offset.

16 Claims, 6 Drawing Sheets

FREQUENCY ESTIMATION APPARATUS AND RELATED METHOD

BACKGROUND

The invention relates to frequency estimation, and more particularly, to a multi-stage apparatus and related method for iteratively correcting an estimated frequency.

For the Global System for Mobile Communications (GSM), General Packet Radio Service (GPRS), or Enhanced Data for GSM Evolution (EDGE) systems, a frequency correction burst (FCB) is always transmitted for a mobile station to synchronize its local oscillator to the carrier frequency of the base station. The FCB contains a single sinusoidal tone with its frequency 67.7 kHz above the nominal carrier frequency. However, some additional frequency offset exists due to the local oscillator. In case low precision crystal oscillators were used, the frequency offset could be larger. Typically, the frequency offset could be 15 ppm, which is about 30 kHz for a carrier frequency in the Digital Communication System (DCS) and Personal Communications System (PCS) bands of GSM/GPRS/EDGE systems. The foregoing large carrier frequency offset makes the initial frequency acquisition difficult. Therefore, an efficient frequency estimation method is required in the presence of large frequency offset.

A conventional approach may estimate the frequency of a single tone in the frequency domain, which requires the computation of fast Fourier transform (FFT). Unfortunately, it is not implementation friendly and requires high computation load. Some approaches use a tracking unit like a phase lock loop, which requires many FCB bursts to achieve good performance. However, the tracking period could be too long to be feasibly implemented. Another approach may use iterative filtering to determine a pole estimate, which requires as much as 8 iterations to achieve good performance.

In the paper entitled "An Iterative Algorithm for Single-Frequency Estimation" published in November 2002 in the IEEE Transactions On Signal Processing Vol. 50, No. 11 a frequency estimator taught. Please refer to FIG. 1. FIG. 1 is a block diagram of an existing frequency estimator 10. The frequency estimator 10 utilizes iterative linear prediction for estimating a single frequency $\hat{\omega}$ based on a set of received samples x(n). In a first iteration, a frequency estimator 12 is used to produce an initial frequency estimate $\hat{\omega}_0$. A first iteration begins when an oscillator 14 is used to generate a complex exponential value according to the initial frequency estimate $\hat{\omega}_0$. This value is then multiplied with the set of received samples x(n) using multiplier 16. The signal is then filtered using a low pass filter 18 to sum $M_1$ consecutive samples. Another frequency estimator 20 is used to calculate a frequency offset $\Delta\hat{\omega}_1$, which is added to the initial frequency estimate $\hat{\omega}_0$ with adder 22. A modulo operation 23 is then applied to ensure that the resulting refined frequency estimate $\hat{\omega}_1$ is between values of $+\pi$ and $-\pi$. A total of K frequency estimation iterations are performed with the frequency estimator 10. The second through K iterations are performed in a manner similar to that of the first iteration. Finally, after K iterations, the estimated frequency $\hat{\omega}$ is output from the frequency estimator 10. It is important to note that the frequency estimator 10 uses original received samples x(n) as an input for each of the iterations. In addition, it is necessary for the frequency estimator 10 to complete all K iterations in order to produce the estimated frequency $\hat{\omega}$. However, there may be times in which the frequency that is estimated after an intermediate iteration is already a very good estimate. Even so, the frequency estimator 10 must still complete all K iterations, which is an inefficient method of calculating the estimated frequency.

SUMMARY

Methods and apparatuses for estimating frequencies are provided. An exemplary embodiment of a method of frequency estimation includes (a) receiving frequency correction channel (FCCH) data samples; (b) calculating an estimated frequency offset based on the received data samples; (c) compensating the received data samples using the estimated frequency offset; (d) repeating steps (b)-(c) for a number of iterations by substituting the compensated data samples for the received data samples in step (b); and (e) summing the estimated frequency offset of each iteration to calculate an overall estimated frequency offset.

An exemplary embodiment of a frequency estimation apparatus includes a frequency estimation device for receiving frequency correction channel (FCCH) data samples and calculating an estimated frequency offset based on the received data samples; a frequency offset correction circuit for compensating the received data samples using the estimated frequency offset; a controller for controlling the frequency estimation device and the frequency offset correction circuit to repeatedly calculate estimated frequency offsets for a number of iterations using the compensated data samples output by the frequency offset correction device; and a summing circuit for summing the estimated frequency offset of each iteration to calculate an overall estimated frequency offset.

DETAILED DESCRIPTION

Another method for estimating single tone frequency with lower complexity while having better performance is described below. The following introduces a method and apparatus of FCB frequency estimation in GSM/GPRS/EDGE communication systems. The method can be used to estimate the frequency offset between the local oscillators of the mobile station and the base station. The frequency offset can be estimated with a method that requires low complexity and a small memory requirement while at the same time ensuring higher accuracy by estimating over several iterations in a multi-stage manner. After the end of each iteration, a frequency offset correction embodiment is applied to correct the frequency offset of the received samples. In addition, a low-complexity quality measurement is applied after the offset correction to determine if the estimation is qualified or not after the end of each iteration. As will be explained below, the number of iterations can be a predefined number or can be early terminated if the quality measurement is acceptable.

Figure 2:
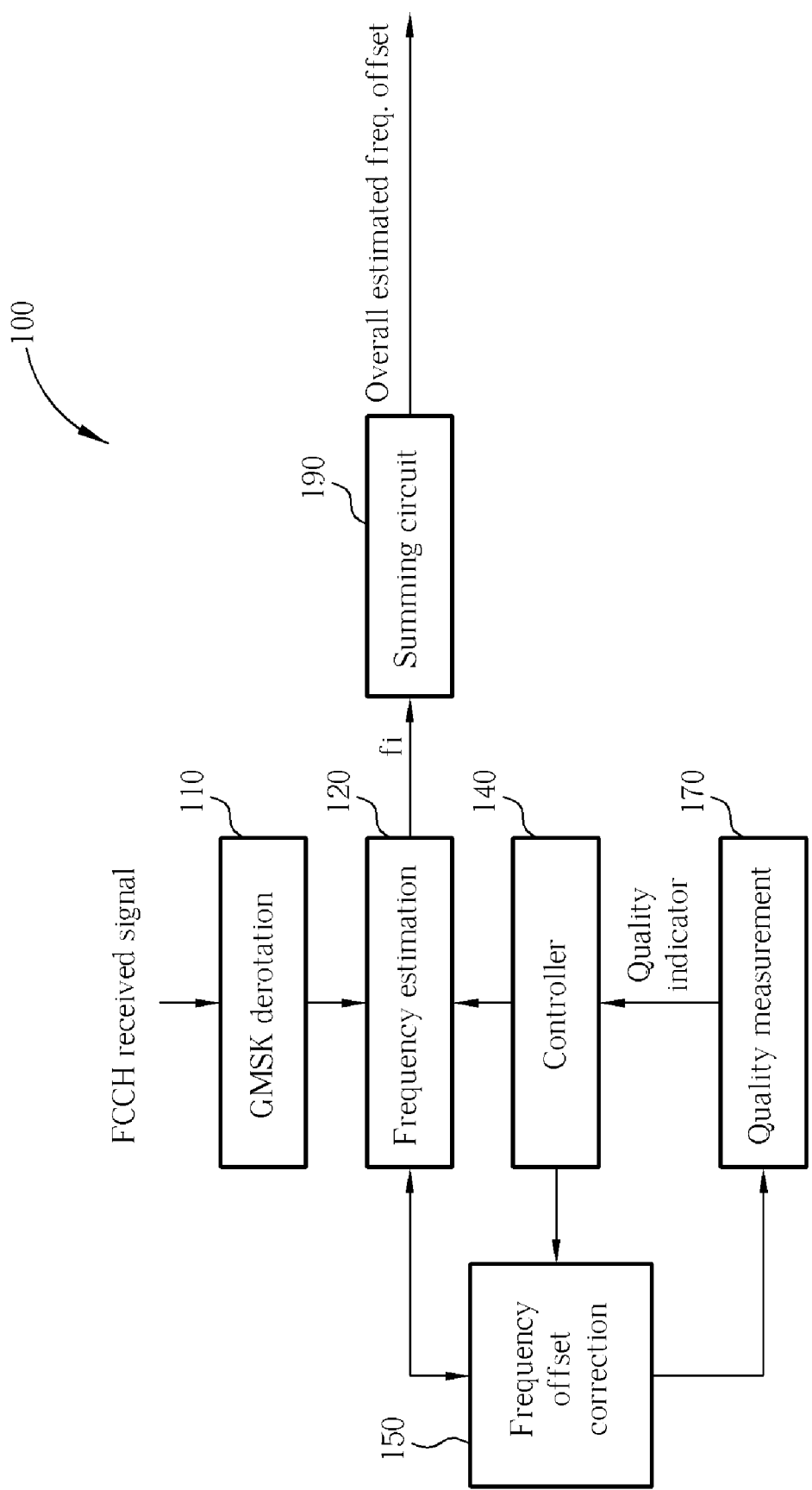
FIG. 2 is a functional block diagram of an exemplary embodiment frequency estimation apparatus.

Please refer to FIG. 2. FIG. 2 is a functional block diagram of an exemplary embodiment frequency estimation apparatus 100. The frequency estimation apparatus 100 receives a set of frequency correction channel (FCCH) data samples and performs a Gaussian Minimum Shift Keying (GMSK) derotation process on the FCCH data samples with a GMSK derotation circuit 110. The derotated FCCH data samples are then output to a frequency estimation device 120 for calculating an estimated frequency offset based on the received derotated FCCH data samples. The estimated frequency offset $f_i$ is then passed to a frequency offset correction circuit 150, which compensates the received derotated FCCH data samples with the estimated frequency offset $f_i$. The compensated data samples are then sent to a quality measurement circuit 170 for calculating a quality measurement of the compensated data samples and outputting a quality indicator to a controller 140. If the quality indicator represents that the current frequency offset estimation not yet acceptable, then the controller 140 instructs the frequency estimation device 120, the frequency offset correction circuit 150, and the quality measurement circuit 170 to keep estimating, correcting, and verifying for another iteration. After the end of each iteration, the frequency offset correction circuit 150 outputs the compensated data samples to the frequency estimation device 120 so that the frequency estimation device 120 can generate another estimated frequency offset $f_i$ based on the compensated data. In this way, the estimated frequency offset produced by the frequency estimation apparatus 100 can become more accurate with each iteration.

During each iteration, the estimated frequency offset $f_i$ it output from the frequency estimation device 120 to a summing circuit 190. The summing circuit 190 adds up the estimated frequency offsets $f_i$ of each iteration to calculate an overall estimated frequency offset. The iterative process of calculating the estimated frequency offset will continue until one of two conditions is met. First of all, the number of iterations to be performed can be given a predetermined limit. Once this predetermined number of iterations has been performed, the controller 140 halts the estimation process. In addition, the iterative calculation process can be halted early if the quality indicator represents that the current frequency offset estimation is already acceptable. At this time, the current value of the overall estimated frequency offset output by the summing circuit 190 is used as the final value of the estimated frequency offset.

Figure 3:
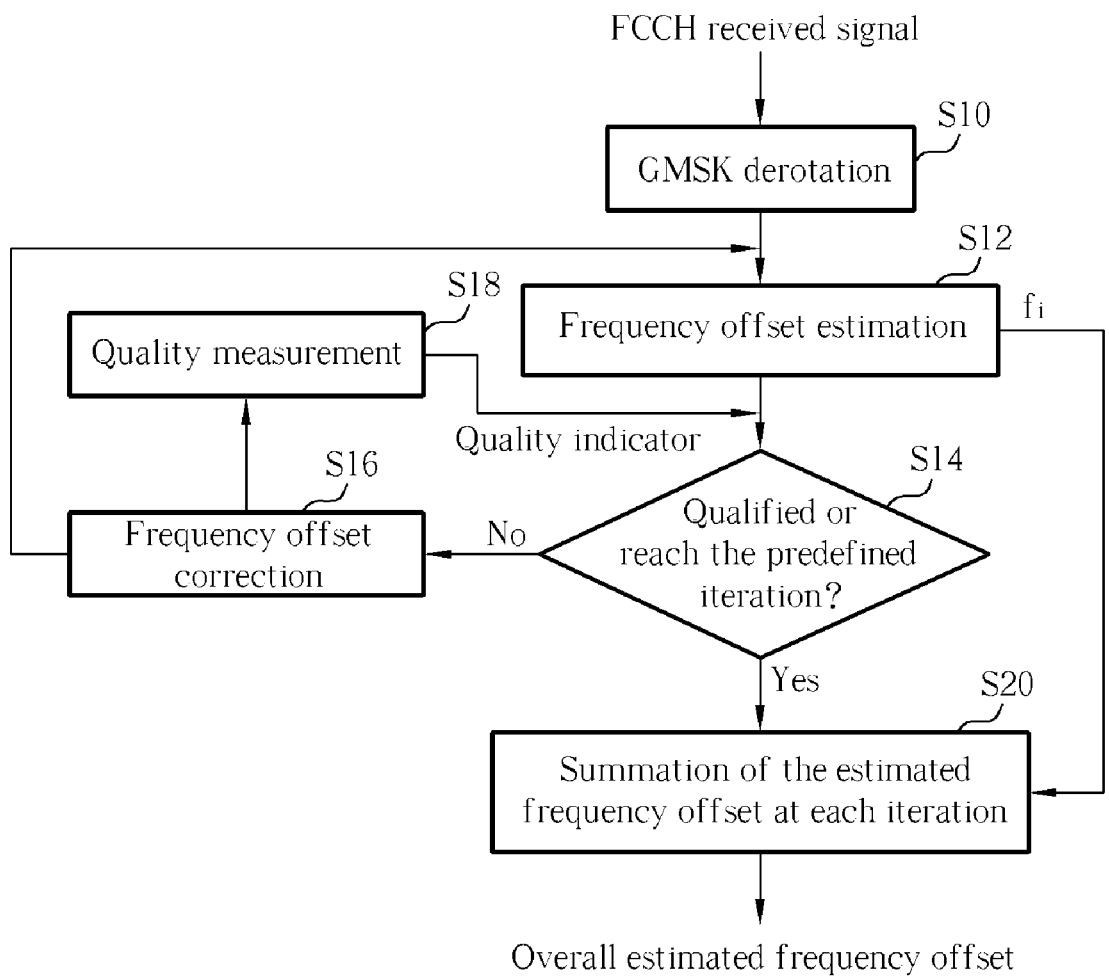
FIG. 3 is a flowchart illustrating an exemplary embodiment for estimating the frequency offset.

Please refer to FIG. 3. FIG. 3 is a flowchart illustrating an exemplary embodiment for estimating the frequency offset. Steps contained in the flowchart will be explained below.

Step S10: Derotate the received FCCH data samples with the GMSK derotation circuit 110;

Step S12: Calculate a current estimated frequency offset $f_i$ based on the received derotated FCCH data samples using the frequency estimation device 120. Meanwhile, the current estimated frequency offset $f_i$ is output to the summing circuit 190 for iteratively accumulating the overall estimated frequency offset;

Step S14: The controller 140 determines if the iterative calculation process should be terminated or not. If the quality indicator received from the quality measurement circuit 170 during the previous iteration represents that the current frequency offset estimation is already acceptable or if a predetermined number of iterations has already been performed, the flow proceeds to step S20. If neither of these conditions is met, the flow proceeds to step S16;

Step S16: The frequency offset correction circuit 150 receives the current estimated frequency offset $f_i$ from the frequency estimation device 120 and compensates the received derotated FCCH data samples with the estimated frequency offset $f_i$. These compensated data samples are fed back to the frequency estimation device 120 for use in calculating the estimated frequency offset $f_i$ in the following iteration. At the same time, the compensated data samples are output to the quality measurement circuit 170;

Step S18: The quality measurement circuit 170 calculates a quality measurement of the compensated data samples and outputs a quality indicator to the controller 140 indicating whether or not the current frequency offset estimation is already acceptable;

Step S20: Each time step S12 is performed, the current estimated frequency offset $f_i$ is output to the summing circuit 190 for iteratively accumulating the overall estimated frequency offset. Once the controller 140 terminates the iterative frequency offset estimation process, the summing circuit 190 outputs the overall estimated frequency offset.

The following sections will explain the operations of the frequency estimation device 120, the frequency offset correction circuit 150, and the quality measurement circuit 170 in detail. It should be noted that the present invention can perform several stages of the frequency offset estimation and quality measurement.

Assuming that the received FCCH received data samples are received through a Rayleigh fading channel, the received signal within one burst can be expressed as:

$$rx[n] = A[n] \cdot e^{j2\pi \frac{\Delta f}{f_s} n} = A[n] \cdot e^{j2\pi \Delta \theta n}, n = 0, \ldots, 155,$$

The received samples are taken at the pre-defined sampling rate, which could be the symbol rate or multiple. In the above equation, $A[n]$ is the fading amplitude, $\Delta f$ is the frequency offset, $f_s$ is sampling rate, and $\Delta \theta$ is the phase error. After the GMSK derotation circuit 110 derotates the received FCCH data samples, the result is output to the frequency estimation device 120.

Figure 4:
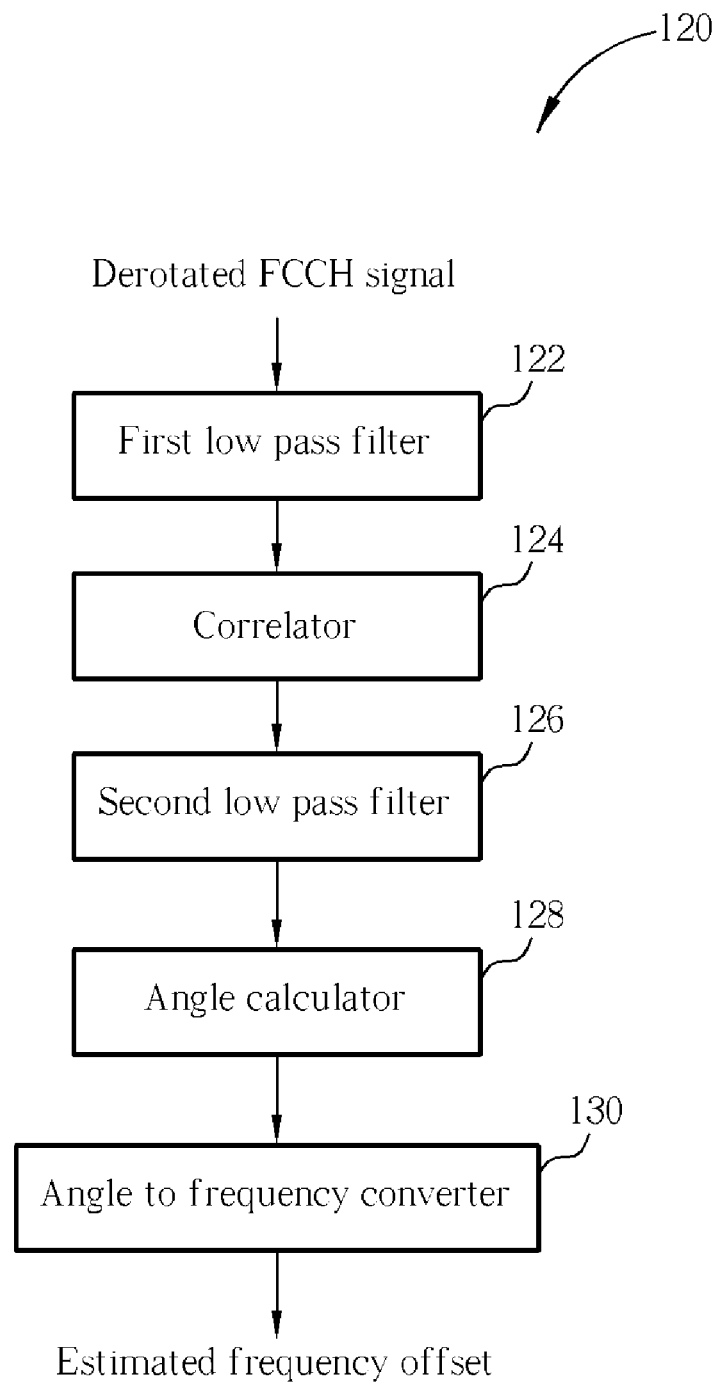
FIG. 4 is a detailed diagram of the frequency estimation device shown in FIG. 2.

Please refer to FIG. 4. FIG. 4 is a detailed diagram of the frequency estimation device 120 shown in FIG. 2. A first low pass filter 122 is used to filter the derotated FCCH data samples to eliminate the noise effect. The bandwidth of the filter is configurable depending on which iteration is being performed for different iterations. Then, a correlator 124 is used to take correlations of the low pass filtered samples. After this, the correlation outputs are averaged by using a second low pass filter 126. Finally, we calculate an angle using the correlation results with an angle calculator 128 and convert the angle to a frequency value with an angle to frequency converter 130. In the following, we make an example to implement the preceding idea.

First, the received signal samples within one burst are divided into several segments. For example, the received I/Q samples within the burst are divided into $N_2$ segments and each segment contains $N_1$ samples. Then, the received signal samples over each segment are accumulated with the first low pass filter 122 to get the summation as shown in the following equation:

$$W[i] = \sum_{j=0}^{N_1-1} rx[N_1 \cdot (i-1) + j], i = 0, \ldots, N_2 - 1$$

$$= A[i] \cdot e^{j2\pi\Delta\theta(n+i\cdot N_1)}(1 + e^{j2\pi\Delta\theta} + e^{j2\pi\cdot 2\Delta\theta} + \ldots + e^{j2\pi\cdot(N_1-1)\Delta\theta})$$

In the above equation, it is assumed that the fading amplitude is fixed during a segment. For easier implementation, $N_1$ and $N_2$ can be chosen to be powers of 2. The parameters $N_1$ and $N_2$ play an important role in each iteration of frequency offset estimation. As the value becomes larger, the accumulation operation over more received symbols behaves like a low-pass filtering with a narrower bandwidth. The estimation is expected to be less noisy. On the other hand, the capture range of the frequency offset is smaller due to the wrapping effects of the arctangent function. For power on mode, the maximum possible frequency offset could be up to (+−)30 kHz. For these reasons, it is preferred to select $N_1$ to be a small integer in the first iteration. The possible value of $N_1$ can be 4 in the first iteration. Different selections of $N_1$ are also possible. For the later iterations, since the frequency offset is corrected by the frequency offset correction circuit 150 at the end of the previous iteration (the correction of the frequency offset will be explained latter), the maximum frequency offset is getting smaller. Therefore, a larger value of $N_1$ can be used for the later iterations.

Next, the correlator 124 is used to perform a correlation operation over the accumulated samples from two neighboring segments and the second low pass filter 126 is used to define a value Sum as:

$$\text{Sum} = \sum_{i=1}^{N_2-1} W^*[i-1] \cdot W[i] \approx \text{Power} \cdot \sum e^{j2\pi\Delta\theta \cdot N_1}.$$

Then, the angle calculator 128 is used to take the arctangent of the variable Sum and get the phase term:

$$\text{angle} = \tan^{-1}\left(\frac{\text{Sum\_im}}{\text{Sum\_re}}\right) = 2\pi\Delta\theta \cdot N_1$$

The angle to frequency converter 130 is then used to calculate the estimated frequency as:

$$\Delta f = f_s \times \Delta\theta = f_s \times \frac{\text{angle}}{2\pi \cdot N_1}.$$

The frequency estimation is performed in multi-stage manner. The frequency offset estimate is denoted as $f_1$ during the first iteration, and then some frequency offset correction is applied with the frequency offset correction circuit 150 on the received samples. The next iteration is activated for the received samples after being compensated from the previous iteration. The iterative operations are performed until the predefined number of iterations is achieved or until a quality indicator produced by the quality measurement circuit 170 indicates that the estimation is qualified (how to derive the quality indicator will be explained below). The whole procedure may be early terminated if the quality indicator represents that the estimation is good enough. The overall estimated frequency offset calculated by the summing circuit 190 is the summation of the estimated frequency at each iteration.

Figure 5:
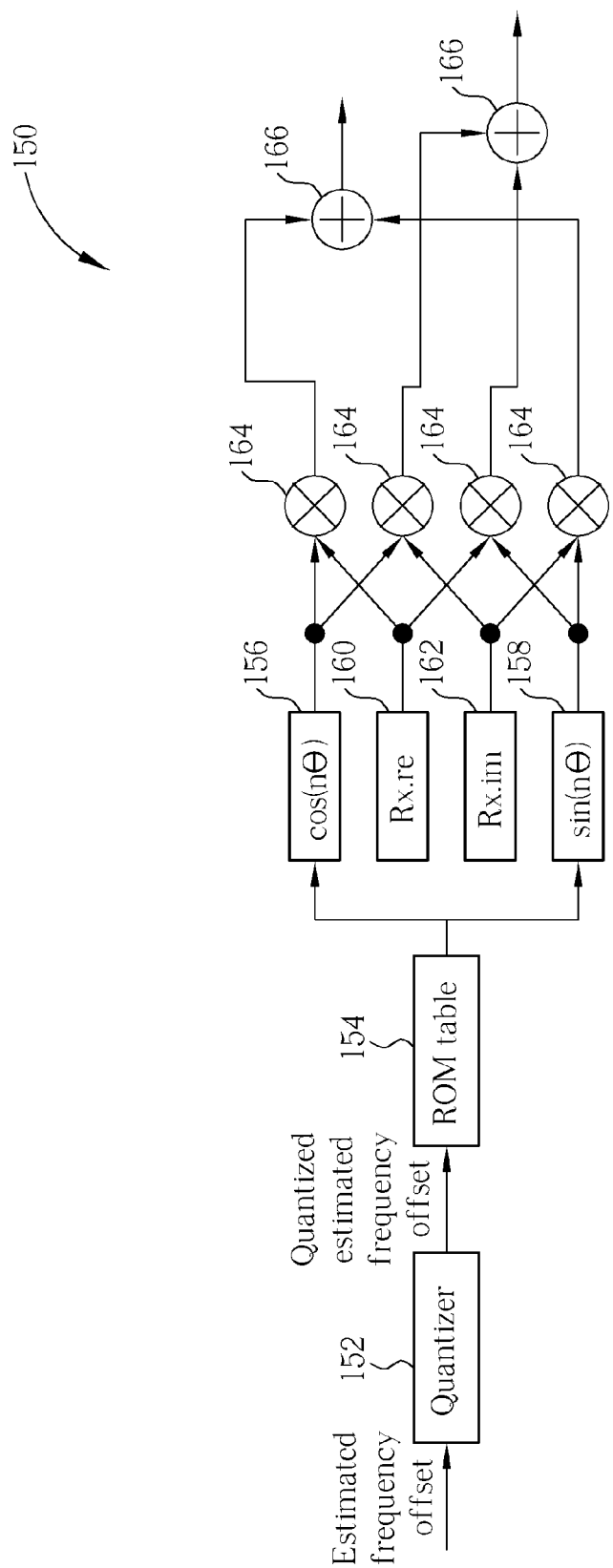
FIG. 5 is a detailed diagram of the frequency offset correction circuit shown in FIG. 2.

Please refer to FIG. 5. FIG. 5 is a detailed diagram of the frequency offset correction circuit 150 shown in FIG. 2. At the end of each iteration, the frequency offset correction circuit 150 is used to apply a frequency offset correction to compensate the received samples. The basic concept is that a frequency estimate in the previous iteration can be used to compensate the received signal and eliminate the residual frequency offset before the next iteration. Due to this compensation, the residual frequency offset is expected to be reduced. Therefore, the further iterations can use narrower bandwidths for the first and second low pass filters 122, 126 to perform frequency offset estimation. The compensation operation is simply the multiplication of received samples via a rotating phase. For practical implementation reasons, the actual frequency offset estimate is not used to correct the signal. Instead, a quantized frequency offset estimate is used. Therefore, the estimated frequency offset is quantized using a quantizer 152, and the quantized frequency offset estimate is used for looking up appropriate sine and cosine values with a finite resolution from 0 to $2\pi$ stored in a ROM table 154. The corresponding sine 158 and cosine 156 values are multiplied with the real 160 and imaginary 162 parts of the received signals with a series of multipliers 164 and adders 166 to get the frequency corrected signals. The number of words used is determined based on the compromise of estimation performance and implementation cost.

Figure 6:
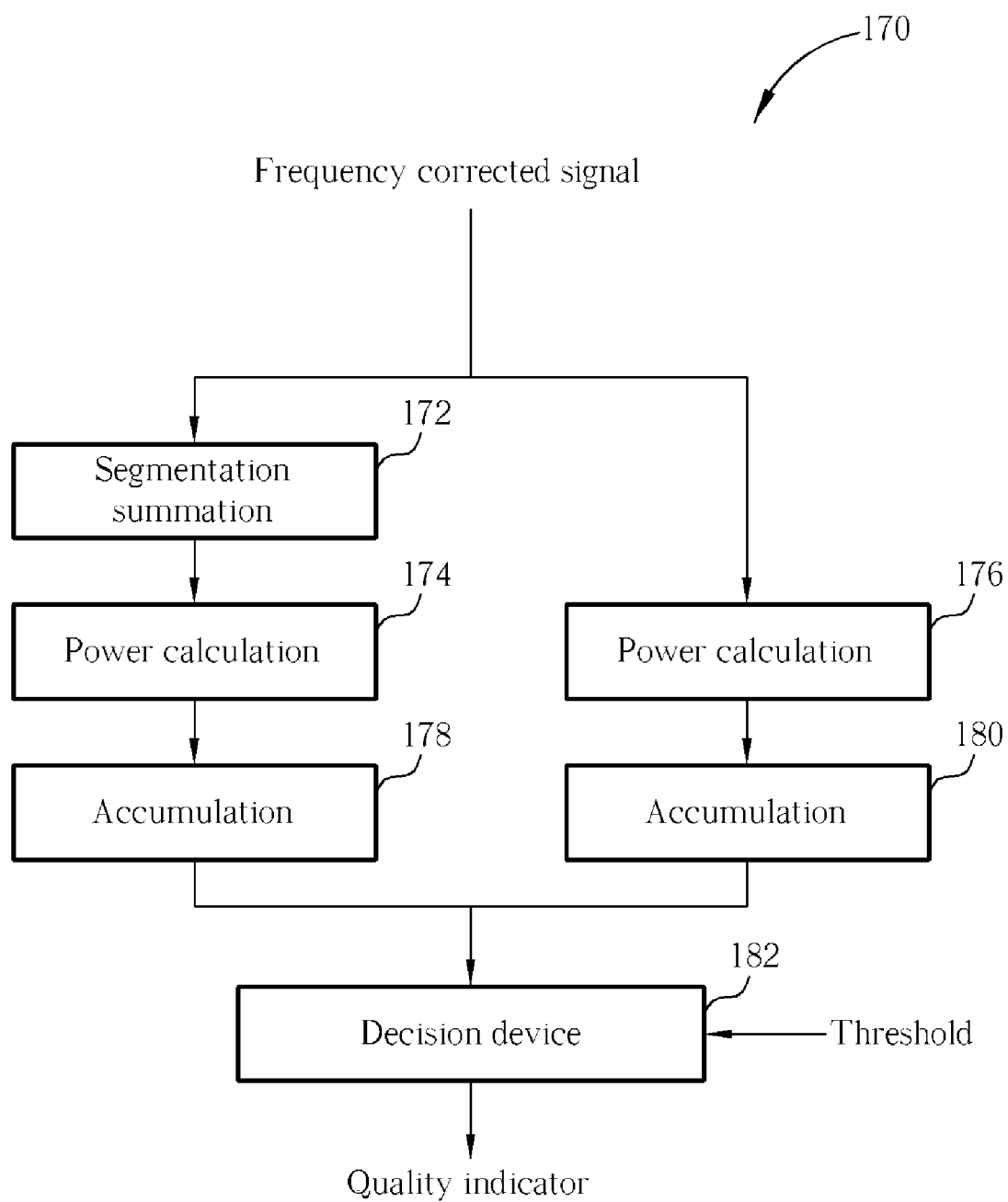
FIG. 6 is a detailed diagram of the quality measurement circuit shown in FIG. 2.

Please refer to FIG. 6. FIG. 6 is a detailed diagram of the quality measurement circuit 170 shown in FIG. 2. Finally, in order to improve the whole performance of FCB detection and frequency estimation, some quality measurement after the frequency offset correction is performed. As shown in FIG. 6, with the frequency corrected signal of the last iteration, we can determine whether this estimate is reliable using the following equation:

$$\text{ratio} = \frac{\text{segment power}}{\text{received power}} = \frac{\sum_{i=0}^{N_2-1}\left|\sum_{j=0}^{N_1-1} rx[N_1 \cdot i + j]\right|^2}{\sum_{i=0}^{N_1 \times N_2-1} |rx[i]|^2}.$$

As shown in FIG. 6, the segment power is calculated using a segmentation summation unit 172, a power calculation unit 174, and an accumulation unit 178. Similarly, the received power is calculated using a power calculation unit 176 and an accumulation unit 180. A decision device 182 calculates the ratio of the segment power to the received power, and determines if the ratio is greater than a threshold value or not. If the ratio is greater than or equal to the threshold, the quality indicator represents that the frequency offset estimation is good enough. On the other hand, if the ratio is less than the threshold, the quality indicator represents that the frequency offset estimation is not yet good enough, and more iterations are needed for trying to improve the frequency offset estimation.

Figure 1:
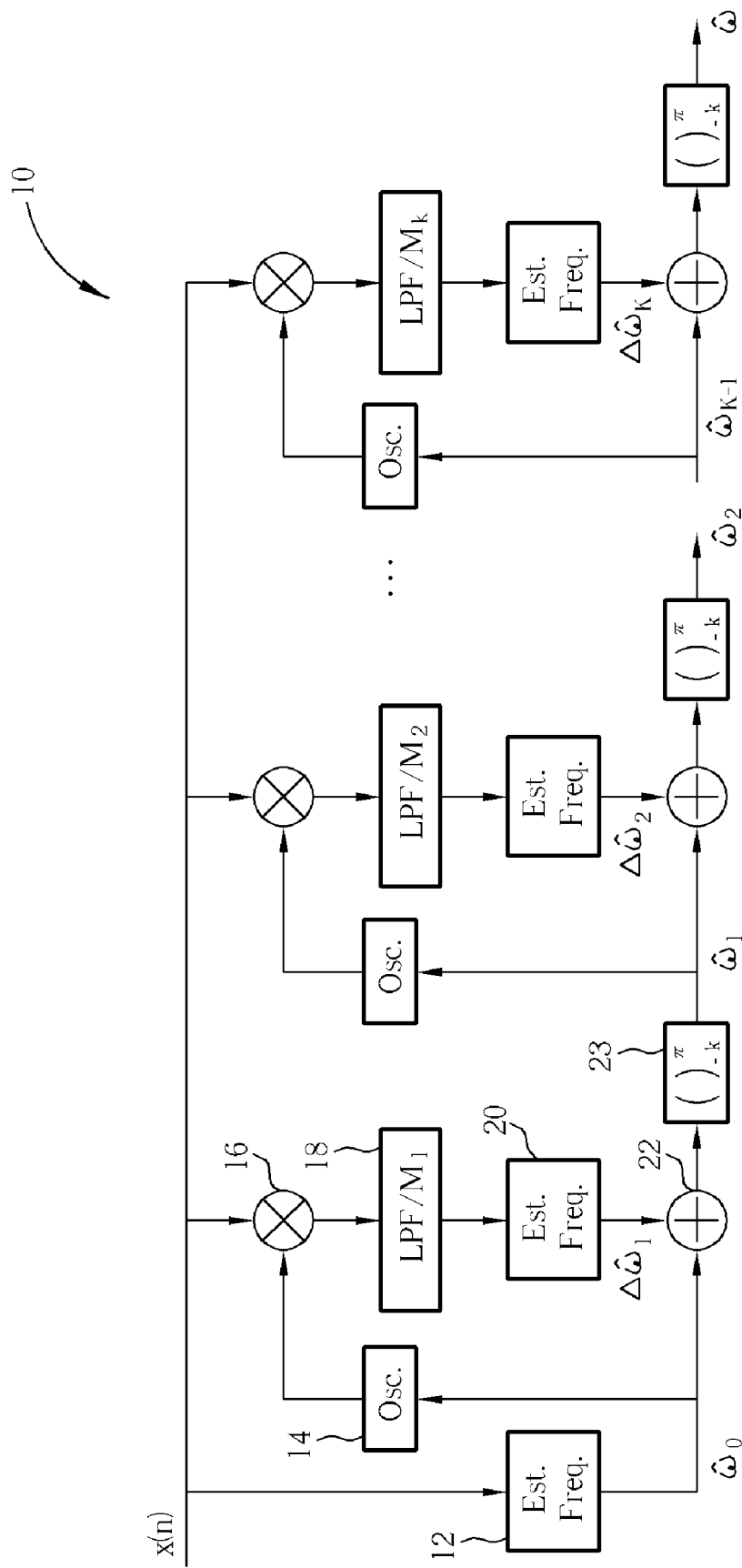
FIG. 1 is a block diagram of an existing frequency estimator.

Compared with the frequency estimator 10 illustrated in FIG. 1, the frequency estimation apparatus 100 of FIG. 2 has several advantages. First of all, the frequency estimation apparatus 100 uses compensated data samples, which are previously corrected, during each iteration, thereby making the estimate more accurate with each iteration. On the other hand, the frequency estimator 10 uses the original received samples x(n) to be corrected for each of the iterations. In addition, the frequency estimation apparatus 100 allows for early termination if the quality indicator represents that the frequency offset estimation is good enough. This can be useful in reducing the required time and computations for estimating the frequency offset. Furthermore, the quantizer 152 used in the frequency offset correction circuit 150 allows fewer sine and cosine values of finite length to be stored in the ROM table 154. Therefore, the proposed method offers a simple and efficient method of calculating the frequency offset estimation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of frequency estimation in a communication system, the method comprising:
    (a) receiving frequency correction channel (FCCH) data samples;
    (b) calculating an estimated frequency offset based on the received data samples;
    (c) compensating the received data samples using the estimated frequency offset;
    (d) repeating steps (b)-(c) for a predetermined number of iterations in a multi-stage manner by substituting the compensated data samples for the received data samples in step (b); and
    (e) summing the estimated frequency offset of each iteration to calculate an overall estimated frequency offset.

2. The method of claim 1, wherein step (b) comprises:
    applying a low pass filter to the received data samples to generate filtered samples;
    correlating the filtered samples and summing the result; and
    calculating the estimated frequency offset based on the summed result.

3. The method of claim 1, wherein step (c) comprises:
    quantizing the estimated frequency offset;
    reading rotating phase values from a memory, the rotating phase values corresponding to the quantized estimated frequency offset; and
    multiplying the received data samples by the rotating phase values to produce the compensated data samples.

4. The method of claim 1, wherein step (c) comprises deriving a quality measurement according to the value of the compensated data samples.

5. The method of claim 4, further comprising terminating the repetition of steps (b)-(c) early when the quality measurement meets predetermined criteria.

6. The method of claim 4, wherein deriving the quality measurement according to the value of the compensated data samples comprises:
    calculating power of the compensated data symbols;
    calculating power of the received data symbols;
    calculating a ratio of the power of the compensated data symbols to the power of the received data symbols; and
    assigning the compensated data samples a good quality measurement if the ratio is greater than or equal to a threshold value or assigning the compensated data samples a bad quality measurement if the ratio is less than the threshold value.

7. The method of claim 6, further comprising terminating the repetition of steps (b)-(c) early when the compensated data samples have a good quality measurement.

8. The method of claim 1, further comprising derotating the FCCH data samples with a Gaussian Minimum Shift Keying (GMSK) derotation process after step (a).

9. A frequency estimation apparatus, comprising:
    a frequency estimation device for receiving frequency correction channel (FCCH) data samples and calculating an estimated frequency offset based on the received data samples;
    a frequency offset correction circuit for compensating the received data samples using the estimated frequency offset;
    a controller for controlling the frequency estimation device and the frequency offset correction circuit to repeatedly calculate estimated frequency offsets for a predetermined number of iterations in a multi-stage manner using the compensated data samples output by the frequency offset correction device; and
    a summing circuit for summing the estimated frequency offset of each iteration to calculate an overall estimated frequency offset.

10. The apparatus of claim 9, wherein the frequency offset correction circuit comprises:
    a quantizer for quantizing the estimated frequency offset;
    a memory for storing rotating phase values, the rotating phase values corresponding to the quantized estimated frequency offset; and
    a multiplier for multiplying the received data samples by the rotating phase values to produce the compensated data samples.

11. The apparatus of claim 9, further comprising a quality measurement circuit for deriving a quality measurement according to the value of the compensated data samples.

12. The apparatus of claim 11, wherein the controller terminates the repeated calculations of the estimated frequency offsets when the quality measurement meets predetermined criteria.

13. The apparatus of claim 11, wherein the quality measurement circuit comprises:
    a first power calculating circuit for calculating power of the compensated data symbols;
    a second power calculating circuit for calculating power of the received data symbols; and
    a decision device for calculating a ratio of the power of the compensated data symbols to the power of the received data symbols and assigning the compensated data samples a good quality measurement if the ratio is greater than or equal to a threshold value or assigning the compensated data samples a bad quality measurement if the ratio is less than the threshold value.

14. The apparatus of claim 13, wherein the controller terminates the repeated calculations of the estimated frequency offsets when the compensated data samples have a good quality measurement.

15. The apparatus of claim 9, further comprising a Gaussian Minimum Shift Keying (GMSK) derotation circuit for derotating the FCCH data samples with a GMSK derotation process and outputting the derotated FCCH data samples to the frequency estimation device.

16. A method of frequency estimation in a communication system, the method comprising:
    (a) receiving frequency correction channel (FCCH) data samples;
    (b) calculating an estimated frequency offset based on the received data samples;
    (c) compensating the received data samples using the estimated frequency offset;
    (d) repeating steps (b)-(c) for a predetermined number of iterations in a multi-stage manner by substituting the compensated data samples for the received data samples in step (b);
    (e) summing the estimated frequency offset of each iteration to calculate an overall estimated frequency offset; and
    (f) utilizing the overall estimated frequency offset in initial frequency acquisition.

* * * * *

UNITED STATES PATENT AND TRADEMARK OFFICE
CERTIFICATE OF CORRECTION

PATENT NO.        : 7,620,125 B1  
APPLICATION NO.   : 11/306365  
DATED             : November 17, 2009  
INVENTOR(S)       : Chang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Fourteenth Day of December, 2010

David J. Kappos  
*Director of the United States Patent and Trademark Office*